US011293359B2

(12) United States Patent
Mischler et al.

(10) Patent No.: US 11,293,359 B2
(45) Date of Patent: Apr. 5, 2022

(54) METHOD AND SYSTEMS FOR AIRFLOW CONTROL

(71) Applicant: Transportation IP Holdings, LLC, Norwalk, CT (US)

(72) Inventors: James Robert Mischler, Girard, PA (US); Luke Michael Henry, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 328 days.

(21) Appl. No.: 16/676,227

(22) Filed: Nov. 6, 2019

(65) Prior Publication Data
US 2020/0072143 A1  Mar. 5, 2020

Related U.S. Application Data

(62) Division of application No. 14/520,539, filed on Oct. 22, 2014, now Pat. No. 10,508,606.

(51) Int. Cl.
*F02D 41/00* (2006.01)
*F02D 41/14* (2006.01)
(Continued)

(52) U.S. Cl.
CPC ..... *F02D 41/0072* (2013.01); *F02D 41/0007* (2013.01); *F02D 41/0052* (2013.01);
(Continued)

(58) Field of Classification Search
CPC ............ F02D 41/0072; F02D 41/1461; F02D 41/1467; F02D 41/401; F02D 41/0007; F02D 41/0052; F02D 41/1454; F02D 2041/1422; F02D 2200/0402; F02D 2200/0414; F02D 2200/0418; F02D 41/18; F02D 2200/703; F02D 41/1462;
(Continued)

(56) References Cited

U.S. PATENT DOCUMENTS 6,360,159 B1  3/2002 Miller et al.
6,422,004 B1 *  7/2002 Takami ............... F02B 37/24
60/285
(Continued)

FOREIGN PATENT DOCUMENTS

CN  101641511 A  2/2010
CN  102454462 A  5/2012
(Continued)

OTHER PUBLICATIONS

Australian Patent Office, Examination Report Issued in Application No. 2015243042, dated Apr. 22, 2016, 7 pages.
(Continued)

*Primary Examiner* — Hung Q Nguyen
(74) *Attorney, Agent, or Firm* — McCoy Russell LLP

(57) ABSTRACT

Various methods and systems are provided for controlling emissions. In one example, a controller is configured to respond to one or more of intake manifold air temperature (MAT), intake air flow rate, or a sensed or estimated intake oxygen fraction by changing an exhaust gas recirculation (EGR) amount to maintain particulate matter (PM) and NOx within a range, and then further adjusting the EGR amount based on NOx sensor feedback.

14 Claims, 7 Drawing Sheets

(51) Int. Cl.
  *F02D 41/40* (2006.01)
  *F02D 41/18* (2006.01)
  *F02M 26/00* (2016.01)

(52) U.S. Cl.
  CPC ...... *F02D 41/1454* (2013.01); *F02D 41/1461* (2013.01); *F02D 41/1467* (2013.01); *F02D 41/401* (2013.01); *F02D 41/1462* (2013.01); *F02D 41/18* (2013.01); *F02D 2041/1422* (2013.01); *F02D 2041/1432* (2013.01); *F02D 2200/0402* (2013.01); *F02D 2200/0414* (2013.01); *F02D 2200/0418* (2013.01); *F02D 2200/703* (2013.01); *F02M 26/00* (2016.02); *Y02T 10/12* (2013.01); *Y02T 10/40* (2013.01)

(58) Field of Classification Search
  CPC ............ F02D 2041/1432; Y02T 10/47; Y02T 10/144; Y02T 10/44; F02M 26/00
  See application file for complete search history.

(56) References Cited

U.S. PATENT DOCUMENTS

| | | | |
|---|---|---|---|
| 6,857,263 | B2 | 2/2005 | Gray, Jr. et al. |
| 6,948,475 | B1 | 9/2005 | Wong et al. |
| 8,103,429 | B2 | 1/2012 | Sivasubramaniam et al. |
| 9,140,179 | B2 | 9/2015 | Primus et al. |
| 2002/0196153 | A1* | 12/2002 | Kinugawa ............... F01N 11/00 340/606 |
| 2009/0007888 | A1* | 1/2009 | Sarlashkar ............. F02D 41/38 123/478 |
| 2010/0131181 | A1 | 5/2010 | Herrmann |
| 2012/0053821 | A1* | 3/2012 | Wolfe ................... F02D 41/401 701/105 |
| 2012/0130622 | A1* | 5/2012 | Yamada ................ F02D 35/028 701/104 |
| 2013/0054122 | A1 | 2/2013 | Aoyagi |
| 2013/0197778 | A1 | 8/2013 | Rodriguez |
| 2014/0109868 | A1 | 4/2014 | Zhu et al. |
| 2014/0109883 | A1 | 4/2014 | Zhu et al. |
| 2014/0261350 | A1* | 9/2014 | Ruth .................... F02D 41/146 123/703 |
| 2015/0308321 | A1* | 10/2015 | Zhang ..................... F01N 3/208 60/286 |

FOREIGN PATENT DOCUMENTS

| | | |
|---|---|---|
| DE | 102005000978 A1 | 7/2006 |
| EP | 0105828 A2 | 4/1984 |
| GN | 103362675 A | 10/2013 |
| JP | S58119954 A | 7/1983 |
| JP | 2000097075 A | 4/2000 |
| JP | 2008267335 A | 11/2008 |
| WO | 2015066666 A1 | 5/2015 |

OTHER PUBLICATIONS

State Intellectual Property Office of the People's Republic of China, Office Action and Search Report Issued in Application No. 201510686899.1, dated Oct. 25, 2017, 24 pages.

* cited by examiner

METHOD AND SYSTEMS FOR AIRFLOW CONTROL

CROSS REFERENCE TO RELATED APPLICATIONS

The present application is a divisional of U.S. patent application Ser. No. 14/520,539 entitled "METHOD AND SYSTEMS FOR AIRFLOW CONTROL", and filed on Oct. 22, 2014. The entire contents of the above-identified application are hereby incorporated by reference for all purposes.

BACKGROUND

Technical Field

Embodiments of the subject matter disclosed herein relate to controlling engine exhaust gas recirculation flow.

Discussion of Art

Engine systems may be configured to maintain emissions within regulated limits while providing optimal fuel economy. Ambient conditions may impact emissions, and thus engine systems may be configured to maintain emissions over a range of ambient conditions. For example, air flow through a turbocharger and heat rejection by an intercooler may each be impacted by ambient temperature and pressure. Changes in airflow may impact air-fuel ratio and intake manifold oxygen concentration, which in turn may impact particulate matter and NOx production. Likewise, changes in heat rejection from the intercooler may impact manifold air temperature, which in turn may impact NOx and particulate matter production.

BRIEF DESCRIPTION

In one embodiment, a controller is configured to respond to one or more of intake manifold air temperature (MAT), intake air flow rate, or a sensed or estimated intake oxygen fraction by changing an exhaust gas recirculation (EGR) amount to maintain particulate matter (PM) and NOx within a range, and then further adjusting the EGR amount based on NOx sensor feedback.

DETAILED DESCRIPTION

The following description relates to embodiments for maintaining engine system exhaust emissions, such as particulate matter (PM) and NOx, within respective ranges. A variety of engine operating parameters, including sensed or estimated intake oxygen fraction, intake air flow rate (and hence air flow through a turbocharger), and intake manifold temperature may impact the production of engine-out emissions. To respond to such changing operating parameters to keep the emissions within range, a controller may be configured to change an exhaust gas recirculation (EGR) amount to maintain PM and NOx within a range, and then further adjust the EGR amount based on NOx sensor feedback. The EGR amount may be adjusted by adjusting an exhaust valve position, for example.

Figure 1:
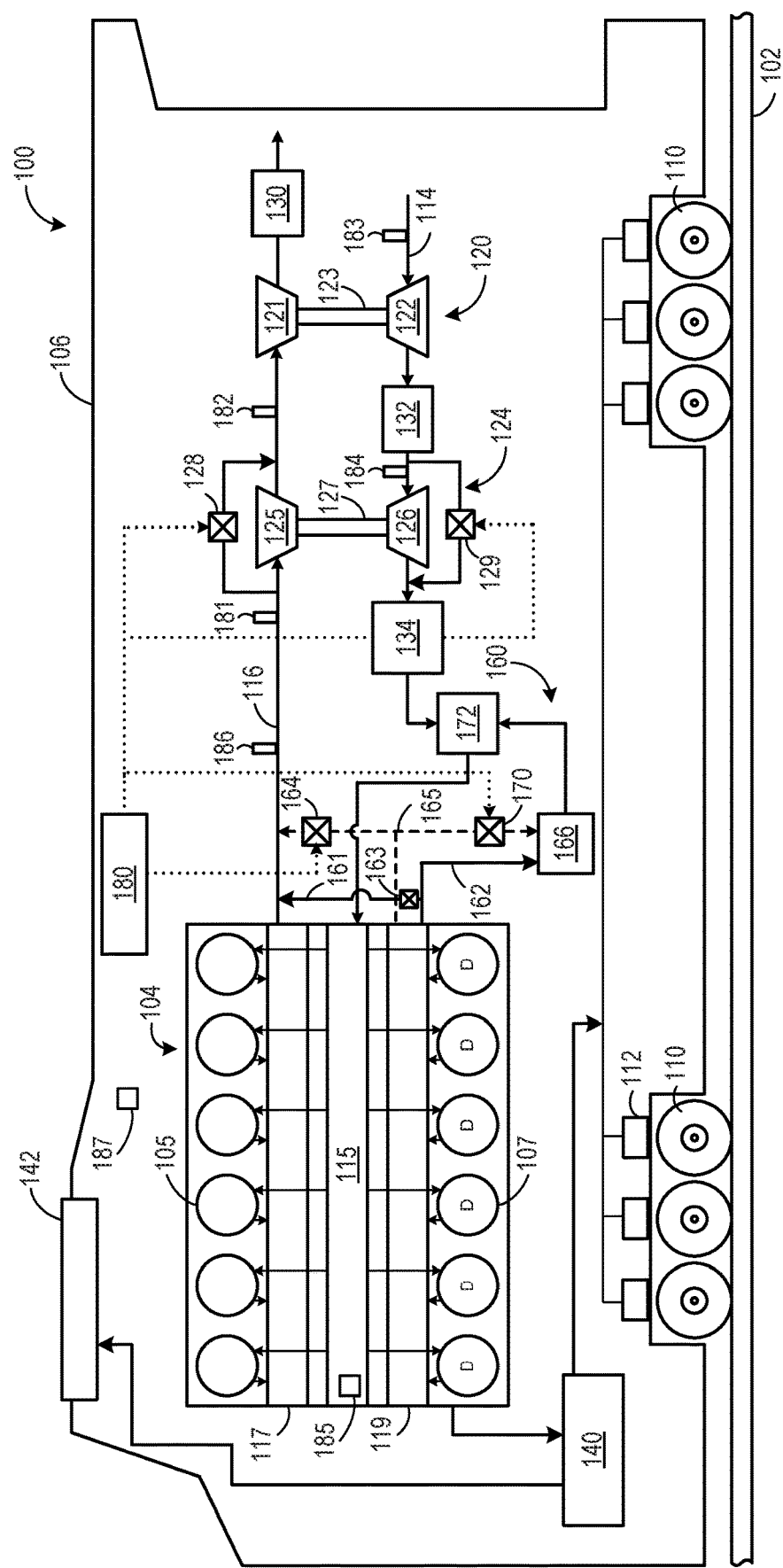
FIG. 1 shows a schematic diagram of a vehicle according to an embodiment of the present disclosure.
Figure 6:
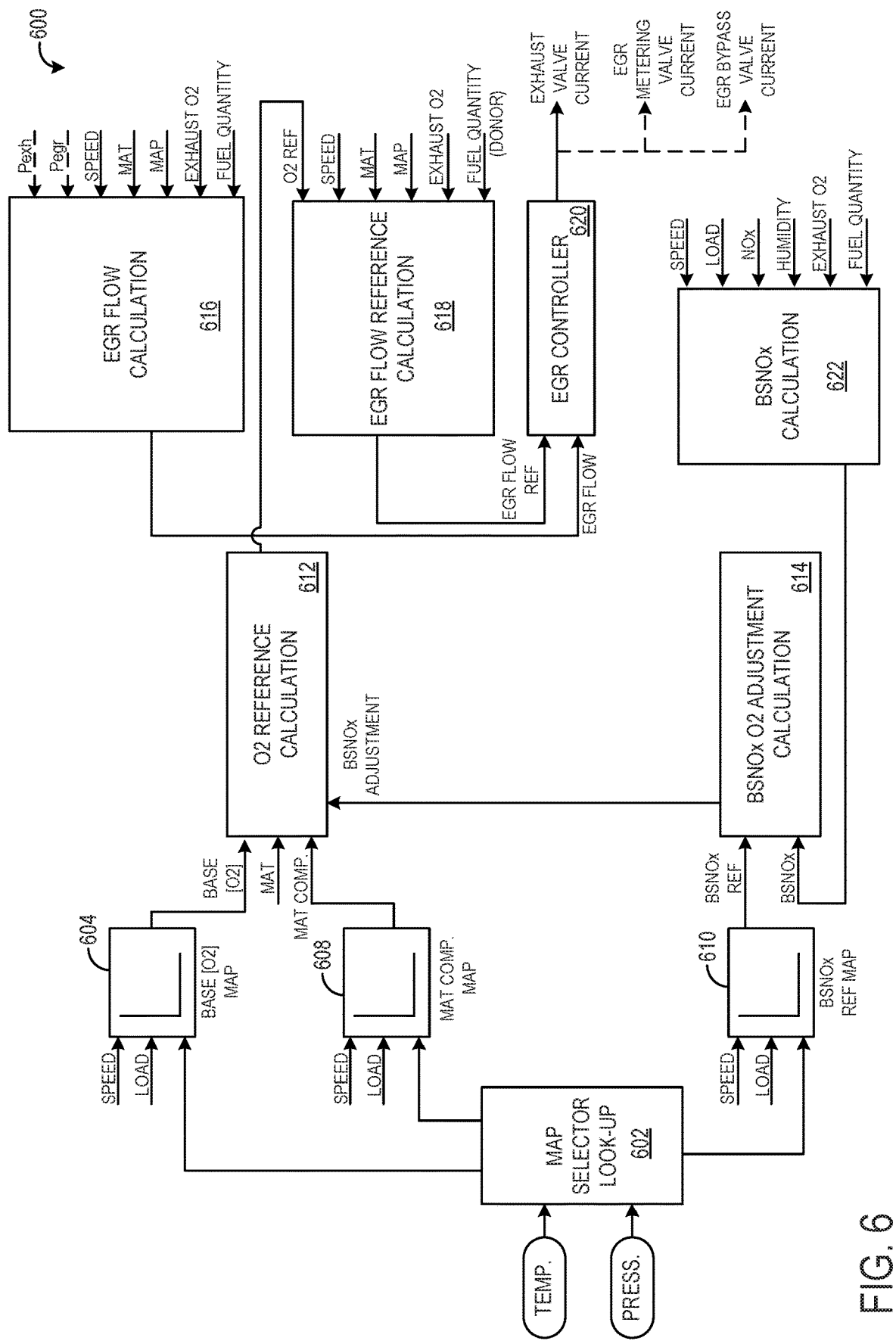
FIGS. 6-7 are control diagrams illustrating engine operation control according to the methods of FIGS. 2-5.
Figure 7:
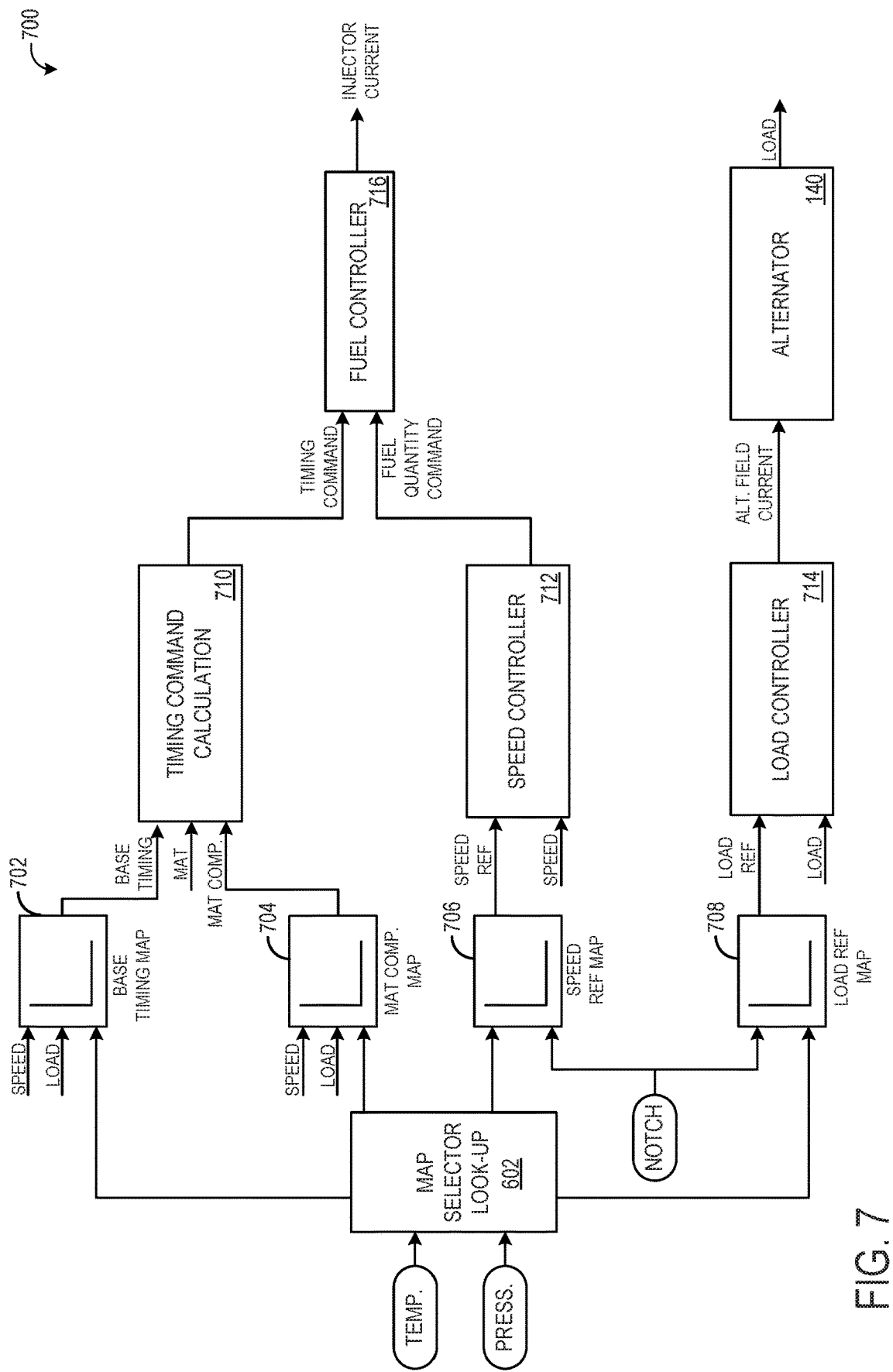

An example system for an engine installed in a vehicle, including a controller, is illustrated in FIG. 1. The controller may be configured to carry out the methods illustrated in FIGS. 2-5 in order to adjust engine operating parameters, such as EGR amount and fuel injection, based on ambient conditions (e.g., ambient pressure and temperature). FIGS. 6-7 illustrate control diagrams for adjusting an EGR amount and fuel injection, respectively, based on ambient conditions. In some examples, the EGR amount may be further adjusted based on feedback from a NOx sensor.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for maintaining exhaust emissions within range, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above.

The engine receives intake air for combustion from an intake, such as an intake manifold 115. The intake may be any suitable conduit or conduits through which gases flow to enter the engine. For example, the intake may include the intake manifold, the intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold, the exhaust passage, and the like. Exhaust gas flows through the exhaust passage, and out of an exhaust stack of the rail vehicle.

In one example, the engine is a diesel engine that combusts air and diesel fuel through compression ignition. As such, the engine may include a plurality of fuel injectors to inject fuel to each cylinder of the engine. For example, each cylinder may include a direct injector that receives fuel from a high-pressure fuel rail. In other non-limiting embodiments, the engine may combust fuel including gasoline, kerosene, biodiesel, or other petroleum distillates of similar density through compression ignition (and/or spark ignition). In a still further example, the engine may combust gaseous fuel, such as natural gas. The gaseous fuel may be ignited via compression ignition of injected diesel fuel, herein referred to as multi-fuel operation, or the gaseous fuel may be ignited via spark ignition. The gaseous fuel may be supplied to the cylinders via one or more gas admission valves, for example. In further examples, the fuel may be supplied to the cylinders via port injection. The liquid fuel (e.g., diesel) may be stored in a fuel tank located on board the rail vehicle. The gaseous fuel may be stored in a storage tank located on board the rail vehicle or on board a different vehicle operably coupled to the rail vehicle.

In one embodiment, the rail vehicle is a diesel-electric vehicle (or diesel/gaseous fuel-electric hybrid). As depicted in FIG. 1, the engine is coupled to an electric power generation system, which includes an alternator/generator 140 and electric traction motors 112. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders are coupled to the exhaust passage to route exhaust gas from the engine to atmosphere (after it passes through an exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a valve 163. The valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a first valve 164 disposed between the exhaust passage and the alternate EGR passage.

The first valve and second valve may be on/off valves controlled by the control unit 180 (for turning the flow of EGR on or off), or they may control a variable amount of EGR, for example. In some examples, the first valve may be actuated such that an EGR amount is reduced (exhaust gas flows from the EGR passage to the exhaust passage). In other examples, the first valve may be actuated such that the EGR amount is increased (e.g., exhaust gas flows from the exhaust passage to the EGR passage). In some embodiments, the alternate EGR system may include a plurality of EGR valves or other flow control elements to control the amount of EGR.

In such a configuration, the first valve is operable to route exhaust from the donor cylinders to the exhaust passage of the engine and the second valve is operable to route exhaust from the donor cylinders to the intake passage of the engine. As such, the first valve may be referred to as an EGR bypass valve, while the second valve may be referred to as an EGR metering valve. In the embodiment shown in FIG. 1, the first valve and the second valve may be engine oil, or hydraulically, actuated valves, for example, with a shuttle valve (not shown) to modulate the engine oil. In some examples, the valves may be actuated such that one of the first and second valves are normally open and the other is normally closed. In other examples, the first and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of turbochargers 120 and 124 in the exhaust passage to a location downstream of the turbochargers in the intake passage. In other embodiments, the vehicle system may additionally or alternatively include a low-pressure EGR system which routes exhaust gas from downstream of the turbochargers fin the exhaust passage to a location upstream of the turbochargers in the intake passage.

As depicted in FIG. 1, the vehicle system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger is provided with a turbine bypass valve 128 which allows exhaust gas to bypass the second turbocharger. The turbine bypass valve may be opened, for example, to divert the exhaust gas flow away from the second turbine. In this manner, the rotating speed of the compressor, and thus the boost provided by the turbochargers to the engine may be regulated during steady state conditions. Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor to avoid compressor surge, for example. In some embodiments, first turbocharger may also be provided with a compressor bypass valve, while in other embodiments, only first turbocharger may be provided with a compressor bypass valve.

The vehicle system further includes an exhaust treatment system 130 coupled in the exhaust passage in order to reduce regulated emissions. As depicted in FIG. 1, the exhaust gas treatment system is disposed downstream of the turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a NO trap, and/or various other emission control devices or combinations thereof. In some examples, the exhaust treatment system may be omitted.

The vehicle system further includes the control unit 180 (also referred to as a controller), which is provided and configured to control various components related to the vehicle system. In one example, the control unit includes a computer control system. The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Further, the control unit may receive signals from intake sensor 185, which may include one or more sensors for measuring intake manifold pressure, intake manifold pressure, or other parameters, exhaust sensor 186, which may include one or more sensors for measuring exhaust oxygen, exhaust NOx, exhaust particulate matter, or other parameters, and ambient sensor 187, which may include one or more sensors for measuring ambient temperature, ambient pressure, ambient humidity (specific and/or relative), or other parameters. As used herein, ambient may refer to conditions of the air external to the engine system, which may include air outside the vehicle, air inside the vehicle, and/or air that is inducted into the engine. Correspondingly, the control unit may control the vehicle system by sending commands to various components such as traction motors, alternator, cylinder valves, throttle, heat exchangers, wastegates or other valves or flow control elements, etc.

The vehicle system may be configured to maintain engine out emissions below regulated limits over a wide range of ambient conditions, while providing optimum fuel efficiency. The ambient conditions, namely ambient temperature and pressure, can effect numerous engine parameters that ultimately impact emissions. As a first example, turbocharger air flow may be impacted by ambient pressure and temperature, which may affect the flow rate, density, or other parameters of the air flow. The turbocharger air flow impacts air-fuel ratio, which in turn impacts PM production. For example, as air-fuel ratio increases, PM production decreases. Turbocharger air flow also impacts intake manifold oxygen concentration in an engine having EGR, which in turn impacts both PM and NOx production. For example, as the oxygen concentration increases, NOx production increases while PM production decreases. In a second example, an intercooler heat rejection may be affected by ambient temperature and pressure, which may affect the temperature differential between the intercooler and intake air. The heat rejection impacts the intake manifold air temperature, which in turn impacts both NOx and PM emissions. For example, as manifold air temperature increases, NOx increases while PM decreases.

As can be appreciated from the above examples, balancing NOx and PM emissions across a variety of ambient conditions may be difficult, as a change in ambient conditions may cause one emission to increase while causing the other emission to decrease. Further, if adjustments are made to engine operating parameters (such as EGR flow) to maintain desired emissions, fuel economy may be impacted in some examples.

Thus, according to embodiments disclosed herein, a series of adjustments based on ambient conditions may be made, starting from a first, "coarse" adjustment down to a final, "fine" adjustment, to maintain emissions within range while providing optimal fuel economy. The first adjustment may include selecting one or more reference value maps from a plurality of possible maps, based on ambient conditions, in order to account for the impact of the ambient conditions on air flow and heat rejection. The values output from the maps may be in turn input into a variety of respective calculations and/or controllers ultimately used to adjust engine operation. A second adjustment may include adjusting an intake manifold oxygen concentration target and injection timing based on intake manifold temperature, to account for the impact of the ambient conditions on intercooler heat rejection. As used herein, "intake manifold oxygen concentration" may include a concentration value (based on weight or volume of the intake air, for example), or may include a percentage of the intake air volume or weight. As such, the intake manifold oxygen concentration may also be referred to as an intake oxygen fraction.

A third adjustment may include controlling EGR flow, via adjustment of one or more exhaust valves, to the target intake manifold oxygen concentration. For the above three adjustments, control of injection timing and exhaust valve position may be based on sensor data, including exhaust oxygen concentration or EGR flow.

The adjustments described above may reasonably control emissions during a wide variety of ambient conditions. As mentioned above, EGR flow may be controlled to reach the target intake manifold oxygen concentration. However, at least in some examples, both EGR flow and intake oxygen concentration are determined based on models, which may introduce error to the adjustments. Further, the relationship between NOx emissions and intake manifold oxygen concentration may be variable. Reducing the sources of error and variation may be important for meeting the desired emissions targets.

Thus, to reduce the above described sources of error and variation, a fourth adjustment may be performed. The fourth adjustment may include adjusting the intake oxygen concentration target based on feedback from a NOx sensor. By directly inputting sensed NOx, the variation between intake oxygen concentration and NOx may be reduced. However, as NOx levels in the exhaust may be impacted by other parameters, a brake specific NOx (BSNOx) may be used, where the sensed NOx is corrected for humidity, exhaust oxygen concentration, and other parameters. As used herein, BSNOx refers to an exhaust NOx concentration that is normalized to engine output (e.g., engine power represented by horsepower). In this way, the disclosure controls on what is actually limited by the regulation (e.g., humidity corrected brake specific NOx).

Accordingly, the control unit (e.g., controller) may be configured to determine exhaust particulate matter (PM) and exhaust NOx concentrations. If NOx concentration is above a NOx threshold, the controller may be configured to reduce an intake air flow rate, and if particulate matter concentration is above a PM threshold, the controller may be configured to increase the intake air flow rate. In some examples the controller may determine the NOx and PM concentrations based on sensed data, from exhaust NOx and/or PM sensors, for example. In other examples, the controller may be configured to determine the exhaust PM and NOx concentrations based on one or more of ambient pressure, ambient temperature, engine speed, engine load, humidity, exhaust oxygen concentration, and NOx sensor feedback.

In order to reduce the intake air flow rate, the controller may be configured to increase an EGR flow rate, and in order to increase the intake air flow rate, the controller may be configured to decrease the EGR flow rate. To adjust the EGR flow rate, the controller may be configured to adjust one or more exhaust valves that control EGR flow, such as EGR valves 163, 164, and/or 170, turbine bypass valve 128, or other valve.

The controller may be configured to select an intake oxygen concentration reference from a map, where the map itself selected from among a plurality of maps based on the determined exhaust PM and NOx concentrations. The controller may be configured to adjust the EGR flow rate based on the intake oxygen concentration reference. Further, in some examples, the controller may be configured to adjust the intake oxygen concentration reference based on manifold air temperature and further based on a corrected exhaust NOx concentration.

Figure 2:
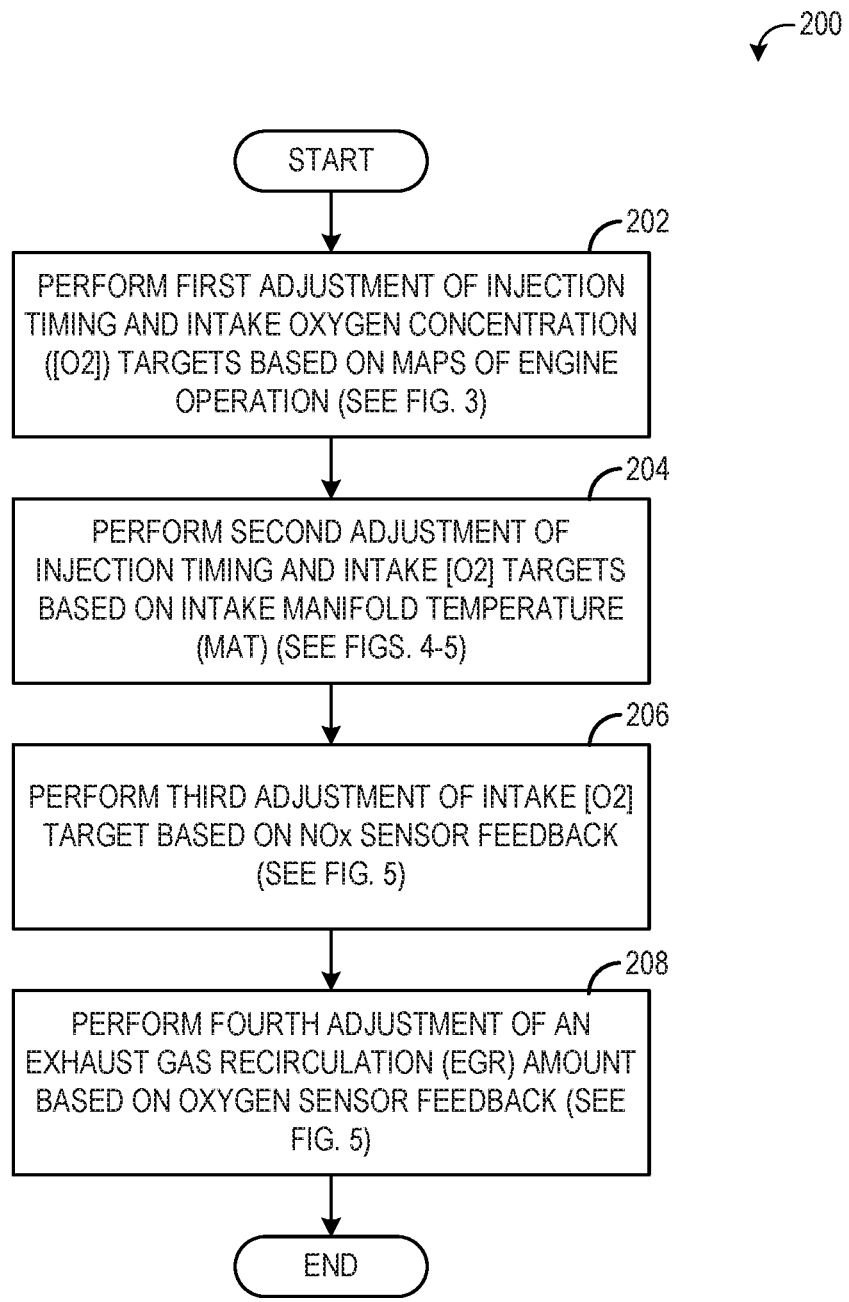
FIG. 2 is a high-level flow chart illustrating a plurality of adjustments for engine operating parameter based on ambient conditions.

Turning now to FIG. 2, a high-level method 200 for controlling emissions is illustrated. Method 200 may be carried out by a controller, such as control unit 180, according to instructions stored thereon. At 202, method 200 includes performing a first adjustment of injection timing and intake oxygen concentration ([O2]) targets based on maps of engine operation. The first adjustment will be explained in more detail below with respect to FIG. 3. Briefly, the adjustment includes inputting ambient conditions, such as temperature and pressure, into a map selector look-up that selects a plurality of engine operation maps based on the ambient conditions. The maps may include reference or target values for intake oxygen concentration, fuel injection timing, speed, load, etc. Engine operation, including fuel injection quantity, fuel injection timing, exhaust valve position, etc., may then be controlled to meet the target values.

At 204, method 200 includes performing a second adjustment of injection timing and intake [O2] targets based on intake manifold temperature (MAT). The second adjustment includes respective MAT compensation factors, output from respective maps selected according to ambient conditions, used to further adjust the target injection timing and intake [O2] targets. The second adjustment is explained in more detail below with respect to FIGS. 4-5. At 206, method 200 includes performing a third adjustment of the intake [O2] target based on NOx sensor feedback, as will be explained in more detail below with respect to FIG. 5. Briefly, feedback from a NOx sensor may be used to fine-tune the target intake [O2] to reduce variation and error. At 208, a fourth adjustment of an EGR amount based on exhaust oxygen sensor feedback is performed, as will be explained in more detail below with respect to FIG. 5. This fourth adjustment includes converting the target intake [O2] to a target EGR flow, where the exhaust valve adjustment made to reach the target EGR flow is based at least in part on feedback from the exhaust oxygen sensor. Method 200 then ends.

Thus, method 200 of FIG. 2 includes a series of adjustments, explained in detail below, that may be performed in order to ultimately control fuel injection timing and EGR flow to meet fuel injection and intake oxygen concentration targets. In doing so, emissions, particularly PM and NOx, may be maintained within regulated limits. In some examples, all four adjustments may be performed, while in other examples, only a portion of the adjustments may be performed. For example, the third adjustment may be performed based on engine operating state. This may include, under some conditions, such as during a cold start, transient operation, or other conditions where feedback from the NOx sensor may be unreliable, dispensing with the third adjustment.

In this way, a series of adjustments from coarse to fine may applied to control injection timing and intake oxygen concentration. The first, most coarse adjustment may have the largest magnitude of impact on the EGR flow target, while the fourth, finest adjustment may have the smallest magnitude of impact on the EGR flow target. In some examples, the coarse to fine adjustment may enable fast response rates to changes in operating conditions that would otherwise be too coarse (although fast) or too slow (but exacting). To achieve the balance between fast response rates and accuracy, a lower gain and a larger filter may be applied to the third adjustment than to the second adjustment of the intake oxygen concentration target, in some examples.

Figure 3:
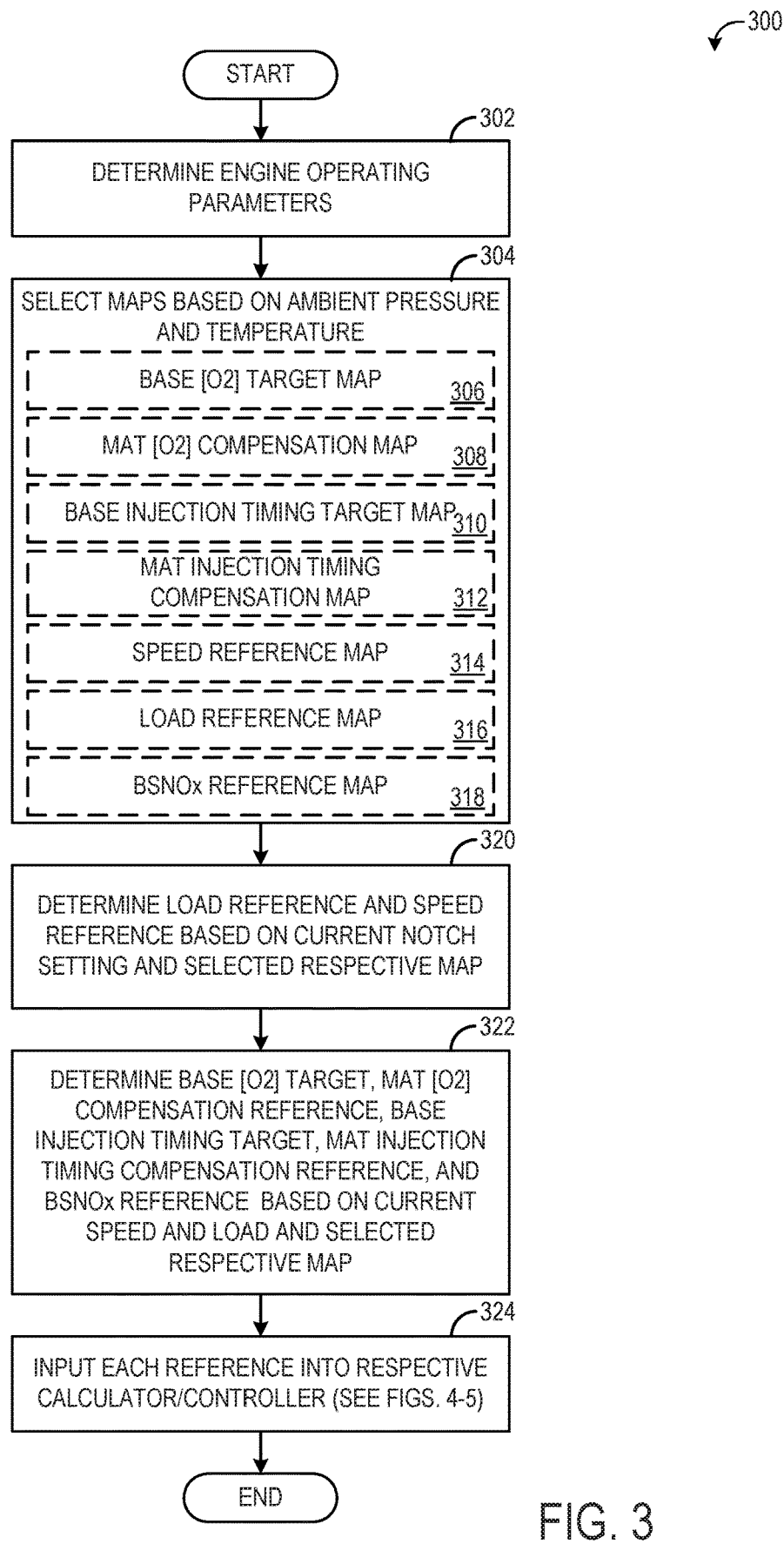
FIG. 3 is a flow chart illustrating a method for determining a plurality of reference engine operation parameter values based on ambient conditions.

FIG. 3 is a flow chart illustrating a method 300 for performing the first adjustment of method 200. At 302, method 300 includes determining engine operating parameters. The determine engine operating parameters may include, but are not limited to, ambient pressure, temperature, and humidity (determined from ambient sensor 187 of FIG. 1, for example), exhaust oxygen and/or NOx concentration (determined from exhaust sensor 186, for example), intake manifold pressure and/or temperature (determined from intake sensor 185, for example), engine speed, engine load, notch or other throttle setting, and/or other parameters.

At 304, method 300 includes selecting one or more maps based on ambient pressure and ambient temperature. The maps may include engine speed and load reference as a function of notch, fuel injection timing target and intake [O2] target as a function of speed and load, and/or other maps. The map output provides references that result in optimum fuel efficiency while meeting emissions targets within the ambient range of that map. Example map selections could include, for each reference map, a base map, a cold ambient map, a hot ambient map, and a high altitude map.

The selected maps may include a base [O2] target map 306, a MAT [O2] compensation map 308, a base injection timing target map 310, a MAT injection timing compensation map 312, a speed reference map 314, a load reference map 316, and a BSNOx reference map 318. However, additional and/or alternative maps may be possible.

At 320, a load reference and speed reference may be determined based on the current notch setting and selected respective maps (e.g., speed reference map 314 and load reference map 316). In this way, the engine may be controlled to reach target speed and load based on ambient conditions and further based on current throttle setting.

At 322, a base [O2] target, MAT [O2] compensation reference, base injection timing target, MAT injection timing compensation reference, and BSNOx reference may be determined based on current engine speed and load and the selected respective map (e.g., base [O2] target map 306, MAT [O2] compensation map 308, base injection timing target map 310, MAT injection timing compensation map 312, and BSNOx reference map 318).

At 324, each reference or target value output from the selected maps in input into respective calculators and/or controllers to control engine operation to meet emission targets, as will be explained below with respect to FIGS. 4-5.

Figure 4:
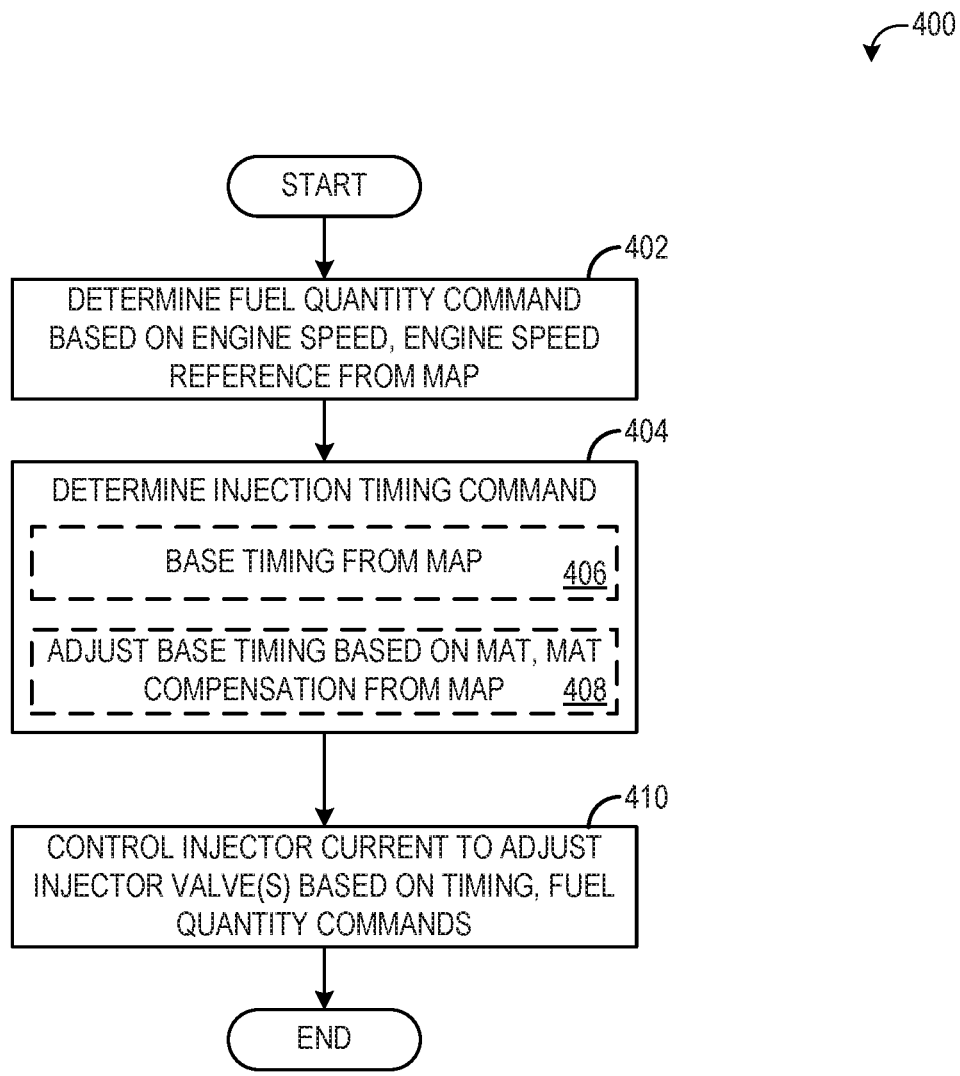
FIG. 4 is a flow chart illustrating a method for adjusting fuel injection based on ambient conditions.

FIG. 4 is a method 400 controlling injection timing. Method 400 includes the second adjustment of method 200. Further, method 400 utilizes maps selected according to method 300. At 402, method 400 includes determining a fuel quantity command based on engine speed and the engine speed reference output from the engine speed reference map 314 described above. At 404, a fuel injection timing command is determined. The fuel injection timing command is determined according to a base timing target output from injection timing target map 310, as indicated at 406. The timing target is adjusted based on MAT and based on the output of the MAT timing compensation map 312, as indicated at 408. At 410, the fuel injector current is controlled to adjust the fuel injector valve(s) based on the fuel injection timing and fuel quantity commands determined above. Method 400 then ends.

Thus, as explained above, fuel injection parameters may be adjusted based on ambient conditions. This may include a first adjustment, described above with respect to FIG. 3, where a base fuel injection timing map, as well as a MAT compensation map, are selected based on ambient conditions, such as temperature and pressure. The selected base injection timing map outputs a fuel injection timing target as a function of engine speed and load. The fuel injection timing target is then subject to a second adjustment based on MAT, where the target is adjusted based on a compensation factor output by the MAT compensation map as a function of MAT. The fuel injector(s) are controlled to meet the target fuel injection timing, as well as controlled to meet the fuel quantity command.

Figure 5:
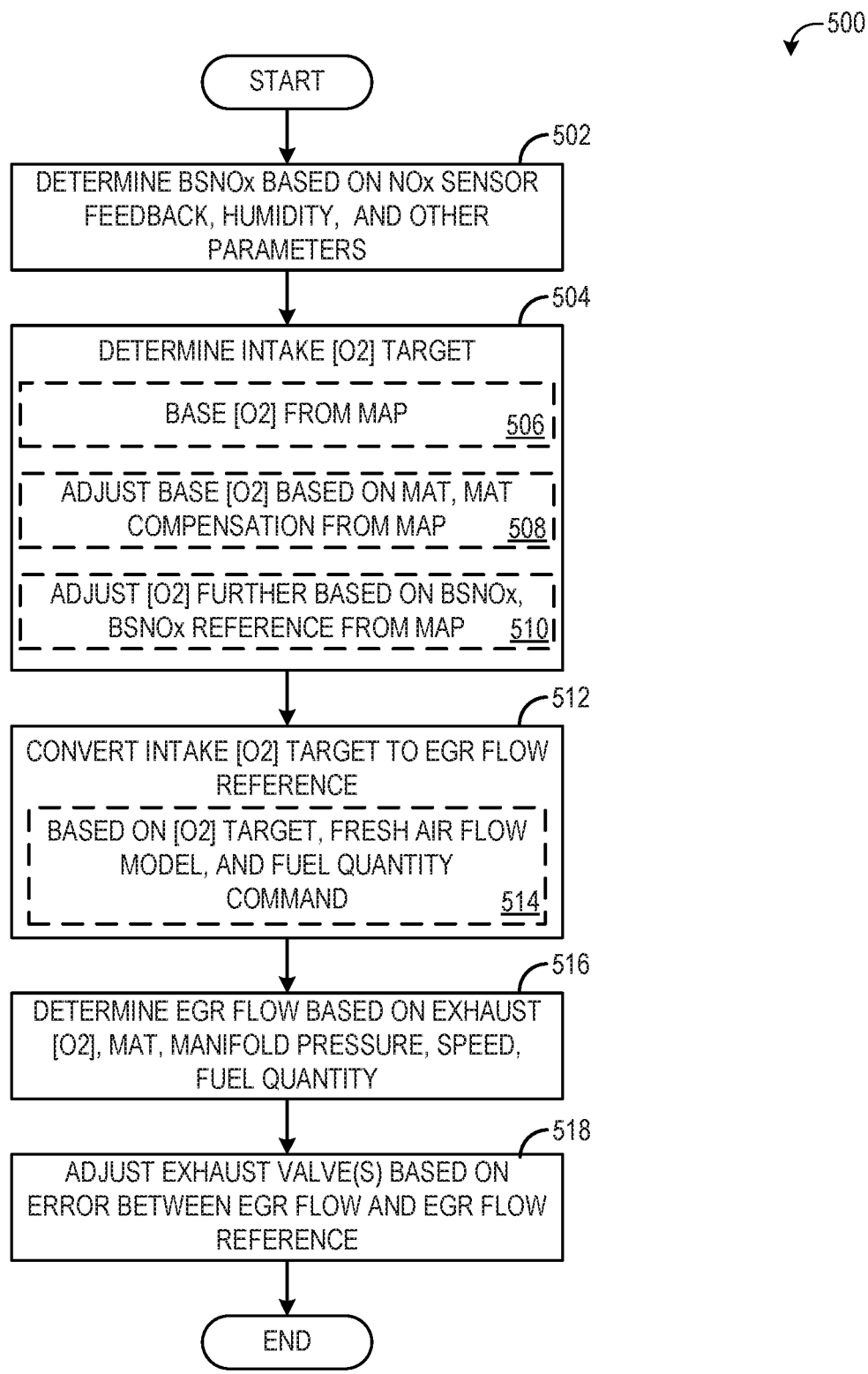
FIG. 5 is a flow chart illustrating a method for adjusting an exhaust valve position based on ambient conditions.

FIG. 5 is a method 500 for controlling a position of one or more exhaust valves to meet a target intake [O2]. Method 500 includes the second, third, and fourth adjustments of method 200. Further, method 500 utilizes maps selected according to method 300. At 502, method 500 includes determining BSNOx based on NOx sensor feedback, humidity, and other parameters. In one example, the other parameters may include exhaust oxygen sensor output, engine power, and fuel flow. The engine power and fuel flow may be modeled or sensed. In another example, the other parameters may include measured fresh air flow or measured EGR flow and a cylinder flow model in place of the fuel flow and exhaust [O2]. The selection of which parameters are used to determine the BSNOx may depend on the sensor configuration of the engine.

At 504, an intake [O2] target is determined. Determining the intake [O2] target includes determining an intake [O2] target according to a base intake [O2] target output from intake [O2] target map 306, as indicated at 506. The base intake [O2] target is adjusted based on MAT and a MAT compensation factor output from map 306, as indicated at 508. The intake [O2] target is adjusted further at 510 based on BSNOx and the BSNOx reference output from map 318.

At 512, the intake [O2] target is converted to an EGR flow reference. This may include determining the EGR flow based on the intake [O2] target, fresh air flow model, and fuel quantity command, as indicated at 514. At 516, actual EGR flow is determined based on exhaust [O2], MAT, manifold pressure, speed, and fuel quantity. At 518, one or more exhaust valves are adjusted based on the error between the EGR flow and EGR flow reference values determined above. Method 500 then ends.

Thus, as explained above, exhaust valve position may be adjusted based on ambient conditions. This may include a first adjustment, described above with respect to FIG. 3, where a base intake [O2] target map, as well as a MAT compensation map, are selected based on ambient conditions, such as temperature and pressure. The selected base intake [O2] target map outputs an intake [O2] target as a function of engine speed and load. The intake [O2] target is then subject to a second adjustment based on MAT, where the target is adjusted based on a compensation factor output by the MAT compensation map as a function of MAT. The intake [O2] target is subject to a third adjustment based on BSNOx, where the target is adjusted based on BSNOx adjustment factor output by the BSNOx map as a function of BSNOx. A fourth adjustment is then performed to convert the intake [O2] target to a reference EGR flow. An actual EGR flow is determined, and the exhaust valve(s) are controlled to based on the error between the actual and reference EGR flows.

FIGS. 6-7 are a series of control diagrams that graphically illustrate the methods of FIGS. 2-5. Specifically, FIG. 6 illustrates a first control diagram 600 directed to controlling exhaust valve position and FIG. 7 illustrates a second control diagram 700 directed to controlling fuel injection parameters. While the control sequence is separated into discrete diagrams, it is to be understood that both controls could be performed simultaneously, and that some of the same control blocks, inputs, and outputs are present in both control diagrams. In one example, separate control diagrams are presented merely for clarity of illustration.

First control diagram 600 of FIG. 6 includes a map selector look-up 602 that selects one or more maps from a plurality of possible maps based on ambient temperature and pressure. In the diagram 600, the map selector look-up selects an appropriate base intake [O2] target map 604, an appropriate MAT compensation map 608, and an appropriate BSNOx reference map 610 based on ambient temperature and pressure. The base intake [O2] target map outputs a base [O2] target as a function of speed and load (where speed and load are understood to be engine speed and load that are modeled and/or sensed). Likewise, the MAT compensation map outputs a compensation factor based on speed and load. Both the base [O2] target and MAT compensation factor are input into an [O2] reference calculation block 612 along with measured MAT.

The BSNOx reference map outputs a reference BSNOx as a function of speed and load. The reference BSNOx is fed into a BSNOx [O2] adjustment calculation block 614 along with determined BSNOx. The BSNOx O2 adjustment calculation block outputs a BSNOx adjustment to the [O2] reference calculation block, which will be described in more detail below.

Returning to the actual BSNOx, it is determined at the BSNOx calculation block 622. As illustrated, the BSNOx calculation block calculates BSNOx based on speed, load, NOx (e.g., NOx ppm as sensed from a NOx sensor), humidity (e.g., specific humidity determined from an ambient humidity sensor), exhaust [O2], and fuel quantity command. The fuel quantity command determination will explained below with respect to FIG. 7.

The [O2] reference calculation block performs a series of adjustments on the base [O2] target output by the base intake [O2] target map. One adjustment includes an adjustment based on MAT, according to measured MAT and the output MAT compensation factor. Another adjustment includes an adjustment based on BSNOx according to the BSNOx adjustment factor output by the BSNOx [O2] adjustment calculation block. The O2 reference calculation block outputs a reference (also referred to as target) intake [O2.] to an EGR flow reference calculation block 618. Here, the intake [O2] reference is used along with speed, MAT, MAP, exhaust [O2], and fuel quantity to determine an EGR flow reference that is input into the EGR controller 620.

The EGR controller also receives an EGR flow amount (e.g., rate) from EGR flow calculation block 616. The EGR flow calculation block determines an EGR flow amount based on speed, MAT, MAP, exhaust [O2], and fuel quantity. However, in some embodiments, an EGR flow sensor may be used to determine the EGR flow amount.

The EGR controller determines the difference (e.g., error) between the target EGR flow (from the EGR flow reference calculation) and the actual EGR flow (from the EGR flow calculation) and adjusts one or more exhaust valves based on the error. In some examples, a gain and/or filter may be applied to the error. The one or more exhaust valves may be suitable valves that control flow of EGR, such as EGR valves 163, 164, and/or 170, turbine bypass valve 128, etc.

The above-described control diagram may be used in a system with a suitable EGR configuration. In the EGR configuration described with respect to FIG. 1, EGR is produced exclusively in a subset of cylinders of the engine, specifically the donor cylinders. In donor cylinder configurations, the control diagram described above may be modified slightly to reflect the differential donor vs. non-donor exhaust manifold pressures, among other parameters. Thus, EGR flow calculation block 616 includes the additional inputs of exhaust pressure (Pexh, the pressure of the non-donor exhaust manifold) and EGR pressure (Pegs, the pressure of the donor exhaust manifold). The EGR flow reference calculation block 618 may include as an input donor cylinder fuel quantity, rather than the fuel quantity for the entire engine. Finally, the output of the EGR controller 620 may include valve current for both the EGR metering valve and the EGR bypass valve.

Second control diagram 700 of FIG. 7 includes the map selector look-up 602 that selects one or more maps from a plurality of possible maps based on ambient temperature and pressure. In the diagram 700, the map selector look-up selects a base injection timing target map 702, a MAT compensation map 704 (specific to adjusting fuel injection timing, and thus separate and distinct from the MAT compensation map 608 of diagram 600), a speed reference map 706, and a load reference map 708.

The base injection timing target map outputs a base injection timing target as a function of speed and load (where speed and load are understood to be engine speed and load that are modeled and/or sensed). Likewise, the MAP compensation map 704 outputs a compensation factor based on speed and load. Both the base injection timing target and MAT compensation factor are input into a timing command calculation block 710 along with measured MAT. The timing command calculation block outputs a timing command to a fuel controller 716.

The fuel controller receives the timing command along with a fuel quantity command output by speed controller

712. The fuel controller controls the fuel injector current to deliver the commanded fuel quantity at the commanded timing. The speed controller determines the fuel quantity command based on the difference between measured engine speed and a speed reference (along with any indicated applied gains and/or filters). The speed reference is determined from the output of speed reference map, which outputs the speed reference as a function of notch or other throttle setting.

Additionally, the map selector look-up outputs a load reference map that outputs a load reference as a function of notch or other throttle setting. The load reference is input into a load controller 714 along with measured load. The load controller outputs an alternator field current based on the difference between the measured and reference load, and adjusts the load on the alternator 140 to reach the reference load.

In this way, a plurality of reference values may be determined based on respective maps that are each selected as a function of ambient conditions. The reference values may be used in a variety of calculation blocks and/or input into controllers to ultimately control various engine operating parameters, including exhaust valve position of EGR flow and hence intake oxygen concentration), fuel injection timing and quantity, engine speed, and engine load. As explained previously, the intake oxygen concentration, fuel injection timing and quantity, engine speed, and engine load each differentially impact emissions and fuel efficiency. By adjusting each engine operating parameter based at least in part on ambient conditions, exhaust emissions (including PM and NOx) may be maintained within target ranges without comprising fuel efficiency. Additionally, by including exhaust sensor feedback from a NOx and/or oxygen sensor, real-time, closed loop control may be provided to reduce error and variation, further improving emission control.

In some examples, the closed-loop BSNOx control may be utilized at steady state speed and load under loaded conditions only. The output of the BSNOx loop may be held (e.g., remembered) or reset to zero when the loop is disabled. Because the BSNOx approaches infinity as brake power approaches zero, the BSNOx loop may not be useful during low load conditions. In some examples, a NOx ppm control loop may be implemented at low loads, such as idle, or an indicated specific NOx control loop may be used at low loads. Further, during transient conditions the NOx control may be disabled due to variations in the relationship between the intake oxygen concentration and BSNOx.

Thus, the systems and methods described herein provide for an embodiment of a controller, such as control unit 180. The controller is configured to respond to one or more of intake manifold air temperature (MAT), intake air flow rate, or a sensed or estimated intake oxygen fraction by changing an exhaust gas recirculation (EGR) amount to maintain particulate matter (PM) and NOx within a range, and then further adjusting the EGR amount based on NOx sensor feedback.

The controller is configured to determine a reference intake oxygen concentration and change the EGR amount based on a difference between the reference intake oxygen concentration and the sensed or estimated intake oxygen fraction. The reference intake oxygen concentration is output from a map that maps reference intake oxygen amount to engine speed and load. The map is selected from among a plurality of maps based on ambient temperature and pressure. The reference intake oxygen concentration is adjusted based on the MAT.

The controller is configured to further adjust the EGR amount based on NOx feedback by determining a brake-specific NOx concentration based on the NOx sensor feedback and adjusting the EGR amount based on a difference between the brake-specific NOx concentration and a reference NOx concentration.

The brake-specific NOx concentration is determined further based on humidity, exhaust oxygen concentration, and engine power, and the reference NOx concentration is output from a map that maps NOx concentration to engine speed and load, where the map is selected from among a plurality of maps based on ambient pressure and ambient temperature.

The controller is further configured to adjust fuel injection timing to maintain PM within the range, the fuel injection timing determined based on a reference injection timing output from a map and adjusted based on the MAT, the map selected from among a plurality of maps based on ambient temperature and pressure.

Another embodiment includes a controller configured to determine exhaust particulate matter (PM) and exhaust NOx concentrations, and if NOx concentration is above a NOx threshold, reduce an intake air flow rate, and if particulate matter concentration is above a PM threshold, increase the intake air flow rate.

The controller is configured to reduce the intake air flow rate by increasing an exhaust gas recirculation (EGR) flow rate and increase the intake air flow rate by decreasing the EGR flow rate. The controller is configured to determine the exhaust PM and NOx concentrations based on one or more of ambient pressure, ambient temperature, engine speed, engine load, humidity, exhaust oxygen concentration, or NOx sensor feedback. The controller is configured to select an intake oxygen concentration reference from a map, the map selected from among a plurality of maps based on the determined exhaust PM and NOx concentrations, and adjust the EGR flow rate based on the intake oxygen concentration reference. The controller is configured to adjust the intake oxygen concentration reference based on manifold air temperature and further based on a corrected exhaust NOx concentration.

An embodiment for a method comprises performing a first adjustment of an injection timing target and an intake oxygen concentration target based on respective maps of engine operation; performing a second adjustment of the injection timing and intake oxygen concentration targets based on intake manifold temperature; performing a third adjustment of the intake oxygen concentration target based on NOx sensor feedback; and performing a fourth adjustment of an exhaust gas recirculation (EGR) amount based on oxygen sensor feedback. The method may be carried out automatically using a controller.

Performing the third adjustment of the intake oxygen concentration target based on NOx sensor feedback comprises applying a lower gain and a larger filter the third adjustment than to the second adjustment of the intake oxygen concentration target.

Performing the fourth adjustment comprises performing a fourth adjustment of the EGR amount based on oxygen sensor feedback and humidity. The method further comprises selectively performing the third adjustment based on engine operational state.

The method further comprises, after performing the third adjustment, converting the intake oxygen concentration to an EGR flow reference and performing the fourth adjustment on the EGR flow reference. Performing the first adjustment comprises selecting a first map for adjusting the injection timing target and selecting a second map for adjusting the intake oxygen concentration target based on ambient conditions.

Performing the second adjustment of injection timing and intake oxygen concentration targets based on intake manifold temperature (MAT) comprises selecting a first MAT compensation map for adjusting the injecting timing target and selecting a second MAT compensation map for adjusting the intake oxygen concentration target based on ambient conditions.

An embodiment for a system comprises an engine having an intake manifold and a plurality of cylinders; an exhaust gas recirculation (EGR) passage to flow EGR from at least a subset of the plurality of cylinders to the intake manifold; and a controller configured to adjust an amount of EGR flow to the intake manifold based on a reference intake oxygen concentration, the reference intake oxygen concentration determined based on a selected map and adjusted based on a corrected exhaust NOx concentration.

The map is selected from among a plurality of different maps based on ambient temperature and ambient pressure. The reference intake oxygen concentration is further adjusted based on intake manifold temperature. The exhaust NOx concentration is sensed from an exhaust NOx sensor and corrected based on humidity, exhaust oxygen concentration, engine speed, engine load, and fuel injection quantity.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    performing a first adjustment of injection timing and intake oxygen concentration targets based on respective maps of engine operation;
    performing a second adjustment of injection timing and intake oxygen concentration targets based on intake manifold temperature;
    performing a third adjustment of the intake oxygen concentration target based on NOx sensor feedback; and
    performing a fourth adjustment of an exhaust gas recirculation (EGR) amount based on oxygen sensor feedback.

2. The method of claim 1, wherein performing the third adjustment of the intake oxygen concentration target based on NOx sensor feedback comprises applying a lower gain and a larger filter to the third adjustment than to the second adjustment of the intake oxygen concentration target.

3. The method of claim 1, wherein performing the fourth adjustment comprises performing a fourth adjustment of the EGR amount based on oxygen sensor feedback and humidity.

4. The method of claim 1, further comprising selectively performing the third adjustment based on engine operational state.

5. The method of claim 1, further comprising, after performing the third adjustment, converting the intake oxygen concentration to an EGR flow reference and performing the fourth adjustment on the EGR flow reference.

6. The method of claim 1, wherein performing the first adjustment comprises selecting a first map for adjusting the injection timing target and selecting a second map for adjusting the intake oxygen concentration target based on ambient conditions.

7. The method of claim 1, wherein performing the second adjustment of injection timing and intake oxygen concentration targets based on intake manifold temperature (MAT) comprises selecting a first MAT compensation map for adjusting the injection timing target and selecting a second MAT compensation map for adjusting the intake oxygen concentration target based on ambient conditions.

8. A system, comprising:
    a controller configured to:
        perform a first adjustment of injection timing and intake oxygen concentration targets based on respective maps of engine operation;
        perform a second adjustment of injection timing and intake oxygen concentration targets based on intake manifold temperature;
        perform a third adjustment of the intake oxygen concentration target based on NOx sensor feedback; and
        perform a fourth adjustment of an exhaust gas recirculation (EGR) amount based on oxygen sensor feedback.

9. The system of claim 8, wherein performing the third adjustment of the intake oxygen concentration target based on NOx sensor feedback comprises applying a lower gain and a larger filter to the third adjustment than to the second adjustment of the intake oxygen concentration target.

10. The system of claim 8, wherein performing the fourth adjustment comprises performing a fourth adjustment of the EGR amount based on oxygen sensor feedback and humidity.

11. The system of claim 8, wherein the controller is further configured to selectively perform the third adjustment based on engine operational state.

12. The system of claim 8, wherein the controller is configured to, after performing the third adjustment, convert the intake oxygen concentration to an EGR flow reference and performing the fourth adjustment on the EGR flow reference.

13. The system of claim 8, wherein performing the first adjustment comprises selecting a first map for adjusting the injection timing target and selecting a second map for adjusting the intake oxygen concentration target based on ambient conditions.

14. The system of claim 8, wherein performing the second adjustment of injection timing and intake oxygen concentration targets based on intake manifold temperature (MAT) comprises selecting a first MAT compensation map for adjusting the injection timing target and selecting a second MAT compensation map for adjusting the intake oxygen concentration target based on ambient conditions.

\* \* \* \* \*